US012724889B2

(12) United States Patent
Tsuchida et al.

(10) Patent No.: US 12,724,889 B2
(45) Date of Patent: Sep. 1, 2026

(54) INFERENCE APPARATUS FOR PERFORMING INFERENCE WITH A MACHINE LEARNING MODEL, INFERENCE METHOD AND COMPUTER-READABLE STORAGE MEDIUM

(71) Applicant: NEC Corporation, Tokyo (JP)

(72) Inventors: Hikaru Tsuchida, Tokyo (JP); Isamu Teranishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 764 days.

(21) Appl. No.: 18/016,223

(22) PCT Filed: Jul. 22, 2020

(86) PCT No.: PCT/JP2020/028498
§ 371 (c)(1),
(2) Date: Jan. 13, 2023

(87) PCT Pub. No.: WO2022/018867
PCT Pub. Date: Jan. 27, 2022

(65) Prior Publication Data
US 2023/0259619 A1 Aug. 17, 2023

(51) Int. Cl.
*G06N 20/00* (2019.01)
*G06F 21/55* (2013.01)

(52) U.S. Cl.
CPC .......... *G06F 21/556* (2013.01); *G06N 20/00* (2019.01)

(58) Field of Classification Search
CPC ....... G06F 21/556; G06F 21/54; G06N 20/00; G06N 3/045; G06N 3/0464; G06N 3/08; G06N 3/09
See application file for complete search history.

(56) References Cited

U.S. PATENT DOCUMENTS

2020/0082272 A1 3/2020 Gu et al.
2020/0097763 A1 3/2020 Haerterich et al.

OTHER PUBLICATIONS

International Search Report for PCT Application No. PCT/JP2020/028498, mailed on Oct. 27, 2020.
Written opinion for PCT Application No. PCT/JP2020/028498, mailed on Oct. 27, 2020.
Reza Shokri, Marco Stronati, Congzheng Song, Vitaly Shmatikov: "Membership Inference Attacks Against Machine Learning Models" (URL: https://arxiv.org/pdf/1610.05820.pdf).
Ahmed Salem, Yang Zhang, Mathias Humbert, Pascal Berrang, Mario Fritz, Michael Backes: "ML-Leaks: Model and Data Independent Membership Inference Attacks and Defenses on Machine Learning Models", Dec. 14, 2018 (URL: https://arxiv.org/abs/1806.01246).

(Continued)

*Primary Examiner* — Kakali Chaki
(74) *Attorney, Agent, or Firm* — Sughrue Mion, PLLC

(57) ABSTRACT

An inference apparatus according to the embodiment including: an inference unit which is machine learning model trained using training data and configured to inference based on input data; a determination unit configured to determine whether input data is the training data or not based on inference data indicating a result of inference when the input data is input to the inference unit; and an output unit configured to output the inference data as output data when the determination unit determines that the input data is not the training data, and configured to output an alternative data different from the inference data as the output data when the determination unit determines that input data is the training data.

6 Claims, 6 Drawing Sheets

(56) References Cited

OTHER PUBLICATIONS

Milad Nasr, Reza Shokri, Amir Houmansadr, "Machine Learning with Membership Privacy using Adversarial Regularization", Oct. 15-19, 2018 (URL: https://arxiv.org/pdf/1807.05852.pdf).
Jinyuan Jia, Ahmed Salem, Michael Backes, Yang Zhang, Neil Zhenqiang Gong, "MemGuard: Defending against Black-Box Membership Inference Attacks via Adversarial Examples", Dec. 18, 2019 (URL: https://arxiv.org/pdf/1909.10594.pdf).
Tindall L, "Membership Inference Attacks On Neural Networks," Gab41, Nov. 10, 2018, Retrieved from the Internet:<URL:https://gab41.lab41.org/membership-inferenceattacks-on-neural-networks-c9dee3db67da>.

INFERENCE APPARATUS FOR PERFORMING INFERENCE WITH A MACHINE LEARNING MODEL, INFERENCE METHOD AND COMPUTER-READABLE STORAGE MEDIUM

This application is a National Stage Entry of PCT/JP2020/028498 filed on Jul. 22, 2020, the contents of all of which are incorporated herein by reference, in their entirety.

TECHNICAL FIELD

The present disclosure relates to inference using a machine learning model.

BACKGROUND ART

Non-Patent literatures 1 and 2 disclose a Membership Inference attack (MI attack) for causing confidential information (for example, customer information, trade secrets, etc.) used for learning from learned parameters of machine learning to be leaked. For example, Non-Patent literature 1 discloses a method of MI attack under the condition that access to an inference algorithm is possible. MI attacks use the "overtraining" phenomenon of machine learning. Overtraining is a phenomenon in which machine learning adapts to data used for learning too much. The tendency of the output in the case where the data used for the learning is input to the inference algorithm is different from that in the case where the data not used for the learning is input to the inference algorithm due to the overtraining. MI attackers exploit this difference to determine whether the data is used for learning or not.

Non-Patent literature 3 discloses a learning algorithm that is resistant to MI attacks. Specifically, the non-patent literature 3 uses an arbitrary known inference algorithm f for machine learning and an identifier h for identifying whether or not data input to f is data used for training f. Then, each parameter is learned in an adversarial manner to increase the inference accuracy of the inference algorithm f and the resistance against the MI attacks.

Non-Patent literature 4 discloses a method called MemGuard. In this method, as a countermeasure against a black box attack under the condition that the learned parameter of the inference algorithm of the target of the attack are not known, the process of misleading the classifier of the attacker is performed.

CITATION LIST

Non-Patent Literature

[Non-Patent Literature 1] Reza Shokri, Marco Stronati, Congzheng Song, Vitaly Shmatikov: "Membership Inference Attacks Against Machine Learning Models" (URL: https://arxiv.org/pdf/1610.05820.pdf)

[Non-Patent Literature 2] Ahmed Salem, Yang Zhang, Mathias Humbert, Pascal Berrang, Mario Fritz, Michael Backes: "ML-Leaks: Model and Data Independent Membership Inference Attacks and Defenses on Machine Learning Models" (URL: https://arxiv.org/abs/1806.01246)

[Non-Patent Literature 3] Milad Nasr, Reza Shokri, Amir Houmansadr, "Machine Learning with Membership Privacy using Adversarial Regularization" (URL: https://arxiv.org/pdf/1807.05852.pdf)

[Non-Patent Literature 4] Jinyuan Jia, Ahmed Salem, Michael Backes, Yang Zhang, Neil Zhenqiang Gong, "MemGuard: Defending against Black-Box Membership Inference Attacks via Adversarial Examples" (URL: https://arxiv.org/pdf/1909.10594.pdf)

SUMMARY OF INVENTION

Technical Problem

In machine learning, data used for learning (also known as training data) may contain confidential information such as customer information and trade secrets. There is a possibility that the confidential information used for the learning may be caused to leak from the learned parameters of the machine learning by a MI attack. For example, an attacker who has illegally obtained a learned parameter may guess the learning data. Alternatively, even if the learned parameters are not leaked, an attacker can predict the learned parameters by repeatedly accessing the inference algorithm. Then, the learning required data may be predicted from the predicted learned parameters.

In Non-Patent literature 3, accuracy and attack resistance are in a trade-off relationship. Specifically, parameters that determine the degree of a trade-off between accuracy and attack resistance are set. Therefore, it is difficult to improve both accuracy and attack resistance.

The method of Non-Patent literature 4 provides a protection by adding noise on the inference result. Therefore, there is a problem that noise affects the inference result regardless of the defense performance.

One of objects of the present disclosure is to provide an inference apparatus, a inference method, and a recording medium having high resistance to MI attacks and high accuracy.

Solution to Problem

An inference apparatus according to the present disclosure includes: an inference unit which is machine learning model trained using training data and configured to perform inference based on input data; a determination unit configured to determine whether input data is the training data or not based on inference data indicating a result of inference when the input data is input to the inference unit; and an output unit configured to output the inference data as output data when the determination unit determines that the input data is not the training data, and configured to output an alternative data different from the inference data as the output data when the determination unit determines that input data is the training data.

An inference method according to the present disclosure includes: inputting input data to an inference unit which is a machine learning model trained using training data; performing inference by the inference unit to output inference data indicating a result of the inference; determining whether the input data is the training data or not based on the inference data; and outputting the inference data as output data when the input data is not the training data, and outputting an alternative data different from the inference data as the output data when the input data is the training data.

A non-transitory computer-readable storage medium according to the present disclosure storing a program that causes a computer to execute an inference method: the method including; inputting input data to an inference unit which is a machine learning model trained using training data; performing inference by the inference unit to output inference data indicating a result of the inference; determining whether the input data is the training data or not based on the inference data; and outputting the inference data as output data when the input data is not the training data, and an alternative data different from the inference data as the output data when the input data is the training data.

Advantageous Effects of Invention

According to the present disclosure, an inference apparatus, an inference method, and a program having high resistance to MI attacks and high accuracy can be provided.

DESCRIPTION OF EMBODIMENTS

Figure 1:
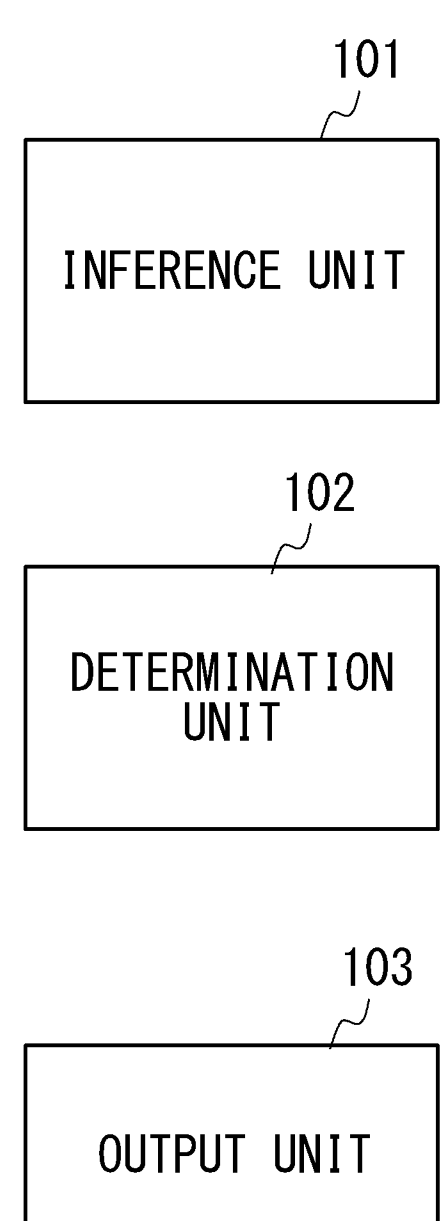
FIG. 1 is a block diagram illustrating an inference apparatus according to the present disclosure.

A inference apparatus according to this embodiment will be described with reference to FIG. 1. FIG. 1 is a block diagram showing the configuration of an inference apparatus 100. The inference apparatus 100 includes an inference unit 101, a determination unit 102, and an output unit 103.

The inference unit 101 is a machine learning model trained using training data, and is configured to perform inference based on input data. The determination unit 102 is configured to determine whether the input data is the training data or not based on inference data indicating a result of inference when the input data is input to the inference unit. The output unit 103 is configured to output the inference data as output data when the determination unit determines that the input data is not the training data, and configured to output an alternative data different from the inference data as the output data when the determination unit determines that the input data is the training data.

According to this configuration, an inference apparatus having high resistance to MI attack and high estimation accuracy can be realized.

Embodiment 1

Figure 2:
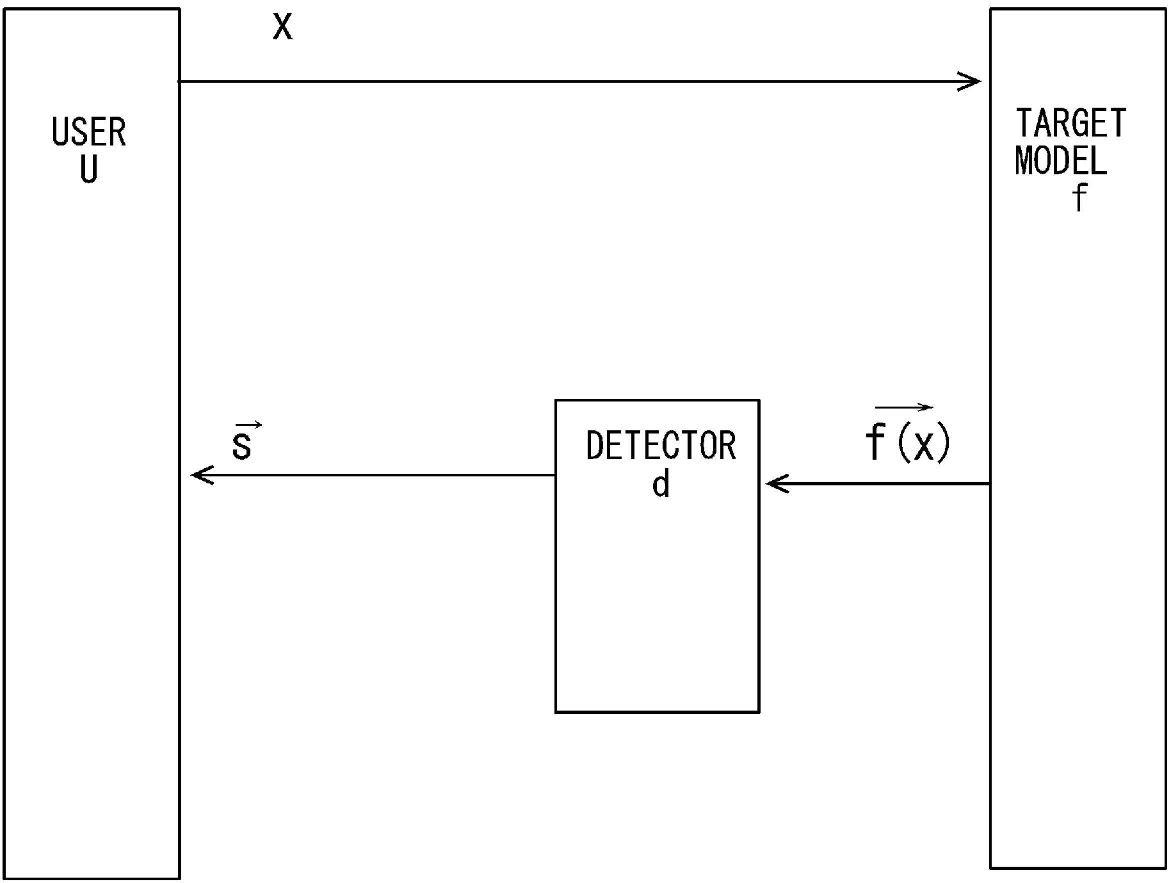
FIG. 2 is a diagram for explaining a process of the inference apparatus according to the first embodiment.

A machine learning apparatus and a machine learning method according to this embodiment will be described with reference to FIG. 2. FIG. 2 is a diagram for explaining the processing of the inference apparatus according to the present embodiment.

A user U queries the inference apparatus by inputting input data x to a target model f. The target model f is an inference unit for performing inference based on the input data x. The target model f corresponds to the inference unit 101 of FIG. 1. The target model f is, for example, a classifier that classifies images. When the input data x is input to the target model f, the target model f outputs the result of the classification of the image.

The target model f is a neural network model such as DNN (Deep Neural Network). The target model f is an inference algorithm using a convolutional neural network (CNN) or the like. The target model f is generated by machine learning. That is, the parameters of the target model f are optimized by machine learning using the training data. The parameters of the target model f correspond to the weight or bias values of the convolution layer, the pooling layer, and the total coupling layer of CNN, respectively.

The output when the input data x is input to the target model f is shown as inference data f (x). The inference data f (x) shows an inference result by means of the target model f. For example, f (x) is a score vector including a plurality of scores. Specifically, for an n-class classification, f (x) is an n-dimensional vector. n is an integer greater than or equal to 2. In the text of the specification, arrows indicating that the inference data f (x), an alternative data r', and the output data s described later are vectors are omitted as appropriate.

The vector component of the inference data f (x) indicates a probability (score) corresponding to each classification result, and takes a value of 0 to 1. The largest value component among the n components (elements) included in the score vector f (x) is a top score.

The inference data f (x) is input to a detector d. The detector d detects whether or not the input data x is training data based on the inference data f (x). The detector d outputs output data s to the user U in accordance with the detection result. The detector d corresponds to the determination unit 102 and the output unit 103 in FIG. 1.

The detector d detects whether or not the input data x is training data from the inference data f (x). Specifically, the detector d is a machine learning model for calculating the detection data d (f (x)) using the inference data f (x) as an input. For example, the detector d is a machine learning model using a neural network such as DNN. The detector d is not particularly limited as long as it is a binary classification model.

The detector d outputs output data s based on the detection result. If the input data x is not training data, detector d outputs inference data f (x) as output data s. When the input data x is training data, the detector d outputs alternative data different from the inference data f (x) as the output data s.

Figure 3:
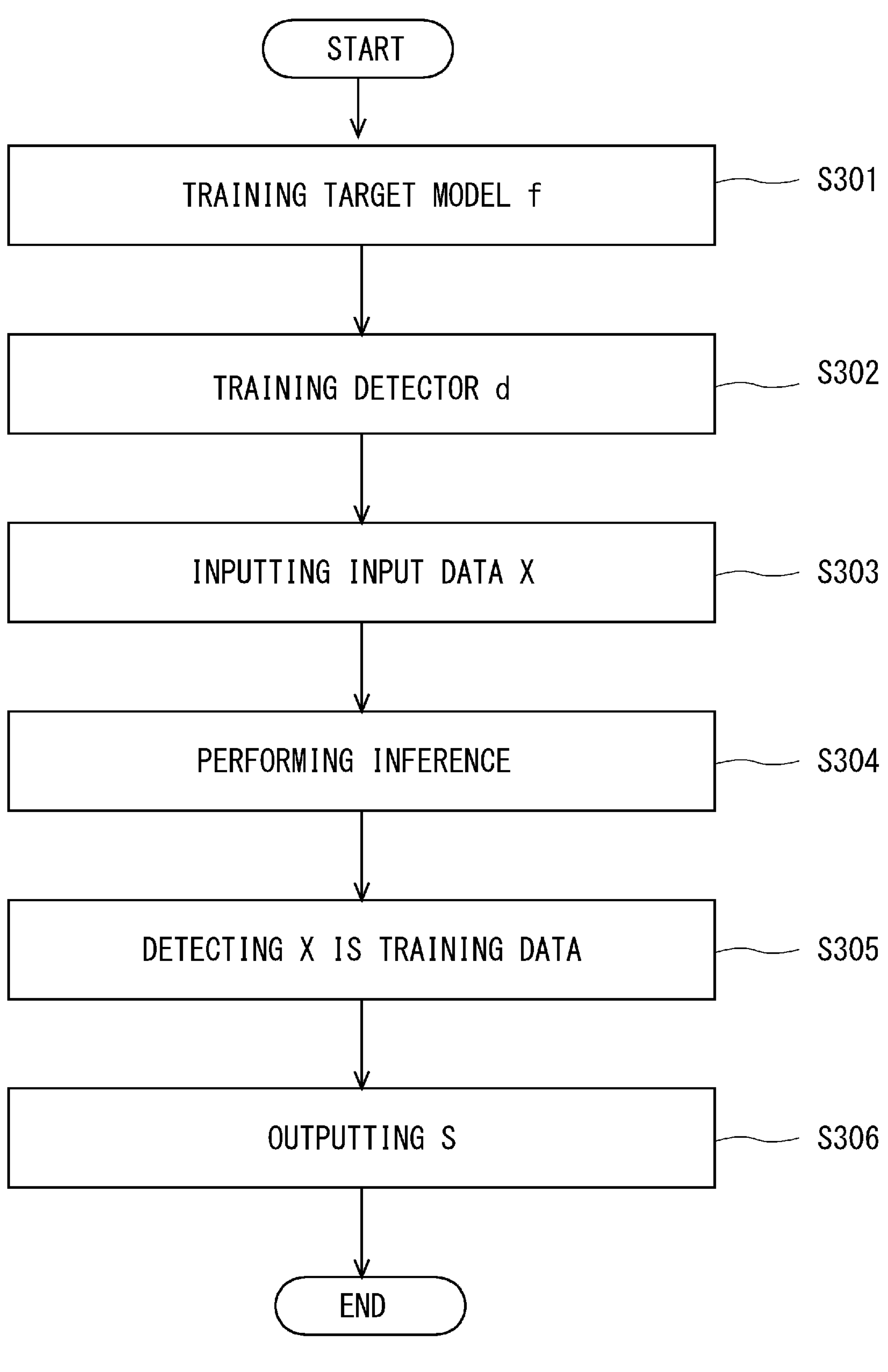
FIG. 3 is a flowchart of a method according to the first embodiment.

Hereinafter, a method according to the present embodiment will be described with reference to FIGS. 2 and 3. FIG. 3 is a flowchart showing a machine learning method and inference method. Steps 301 and 302 correspond to the machine learning method, and steps 303 to 306 correspond to the inference method.

Machine learning of a target model f and a detector d is performed prior to inference by the target model f. First, the target model f is trained using the training data (S301). Here, for example, supervised learning using training data is performed. A correct answer label (also called teacher signals or teacher data) is associated with the training data. The parameters of the target model f are optimized so that the inference result matches the correct answer label.

The detector d is then trained (S302). For example, machine learning of the detector d is performed using the target model f, member data, and non-member data. The member data is training data used for training the target model f in step S301. The non-member data are data not used for training the target model f.

The detector d performs binary classification based on an input reliability (confidence score). Accordingly, the detector classifies whether the score is for member data or non-member data. For example, in the member data, the top score of f (x) becomes very close to 1 as a result of overtraining. In the non-member data, the top score of f (x) is smaller than that in the member data. Therefore, the detector d can detect the input data x is the member data when the top score of the inference data f (x) is very close to 1. Specifically, the detector d can be trained using a method similar to the training method of the Attack Classifier of Non-Patent literature 3.

In the training of the detector d, the member data and the non-member data are randomly selected and input to the target model f. The inference data f (x) of a target model f is input to the detector d. Machine learning of the detector d can be supervised learning. A correct answer label is associated with the inference data f (x). The correct answer label can be a binary value indicating whether x is member data or non-member data. Specifically, if x is member data, the correct answer label is 0, and if x is non-member data, the correct answer label is 1. The parameters of the detector d are optimized so that the detection result of the detector d matches the correct answer label.

Thus, the detector d becomes a machine learning model generated by machine learning. The parameters of the detector d are learned by supervised learning using member data and non-member data. The parameters of detector d correspond to the weight or bias values of the convolution, pooling, and total coupling layers of CNN, respectively. Since the parameters of the target model f are determined in step 301, they are not changed in the machine learning of the detector d in step 302. That is, the machine learning of the detector d is performed while the parameters of the target model f are fixed.

As described above, a machine learning method for the target model f and the detector d is implemented. When machine learning for the target model f and the detector d is completed, inference using the target model f is performed.

The user U inputs the input data x to the inference apparatus 100 (S303). The target model f and the detector d cannot be recognized from the user U of the inference apparatus 100. That is, the user U querying the input data x receives only the output data s.

The queried input data x is input to the target model f. The target model f performs inference based on the input data w (S304). The target model f outputs inference data f (x) indicating an inference result to the detector d.

The detector d detects whether or not the input data x is training data based on the inference data f (x) (S305). As described above, the training data is the member data used for training the target model f.

The output when the inference data f (x) is input to the detector d is defined as detection data d (f (x)). The detector d calculates detection data d (f (x)). The detector d infers whether the input data x is the member data or the non-member data from the inference data f (x) based on the detection data d (f (x)). The detection data d (f (x)) takes a value of 0 to 1 as expressed by the following equation (1).

[equation 1]

$$d(\overrightarrow{f(x)}) \in [0, 1] \tag{1}$$

The closer the detection data d (f (x)) is to 1, the higher the possibility that x is non-member data. The closer the detection data d (f (x)) is to 0, the higher the possibility that x is member data. A threshold value for determining whether input data x is training data (Member Data) is defined as k. k is, for example, a hyperparameter. The detector d determines that x is non-member data when d (f (x)) is equal to or greater than k. The detector d determines that x is member data when d (f (x)) is less than k. Thus, the detector d performs binary classification using the threshold k.

The detector d outputs the output data r based on the determination result (S306). When x is the non-member data, the detector d outputs inference data f (x) as output data s. When x is the member data, the detector d outputs the alternative data r' as output data s. The detector d returns the output data s to the user in accordance with the detection result. The output data s is expressed by the following equation (2).

[equation 2]

$$\vec{S} = \begin{cases} \overrightarrow{f(x)} & \left(k \geq d(\overrightarrow{f(x)})\right) \\ \vec{r'} & \text{(otherwise)} \end{cases} \tag{2}$$

(Approach1)

The Approach 1 for obtaining alternative data r' will be described. It is assumed that the target model f is an inference model for performing n-class classification. When the inference data f (x) is a score vector, the inference data f (x) is shown as the following equation (3).

[equation 3]

$$\overrightarrow{f(x)} = (f_1, \ldots, f_n) \tag{3}$$
$$\left(\text{s.t. } 1 = \sum_{i=1}^{n} f_i,\ f_i \geq 0\right)$$

i is an arbitrary integer from 1 to n. The score fi takes the value of 0 to 1. As shown in equation (3), the sum of the scores $f_i$ is 1. In the inference data f (x), $f_1$ is the first component of the vector and $f_n$ is the n-th component of the vector. Subscripts $i_1, i_2, \ldots i_n$ are used in a descending order of the score $f_i$. That is, the following equation (4) holds:

[equation 4]

$$f_{i_1} > \ldots f_{i_2} > \ldots f_{i_n} \tag{4}$$

In the inference data f (x), $f_{i1}$ is a component having the largest score, and $f_{i2}$ is a component having the second largest score. The $f_{in}$ becomes a component having the n-th largest score. That is, $f_{in}$ is the component having the smallest score.

The detector d generates n random numbers $r_1, \ldots r_n$. The random numbers $r_1 \ldots r_n$ are non-negative values generated at random. m is the sum of n random numbers $r_1$ and $\ldots r_n$ as show on in the following equation (5).

[equation 5]

$$m = \sum_{i=1}^{n} r_i \tag{5}$$

The alternative data r' is a vector having the same number of dimensions as that of the inference data f (x). That is, the alternative data r' is an n-dimensional vector like the inference data f (x). When the vector of the alternative data r' is represented as $(r_1', \ldots r_n')$, the components $r_1'$ to $r_n'$ of the alternative data r' can be represented by the following equation (6).

[equation 6]

$$\vec{r'} = (r'_1, \ldots, r'_n) \quad (6)$$
$$r'_{i_j} = r_{i_j}/m$$
$$(j = 1, \ldots, n)$$

The detector d rearranges n random numbers ($r_1, \ldots, r_n$) in accordance with the relationship between the magnitude of the scores of the inference data f (x). The magnitude relationship of the scores of the alternative data r' matches the magnitude relationship of the scores of the inference data f (x). Specifically, the detector d maintains the magnitude relationship of the scores by ij, and sets the sum of the scores to 1 by m. The inference data f (x) and the alternative data r' are score vectors having the same number of dimensions. Each component of the alternative data r' indicates a reliability (score) of each class.

The relationship between the magnitude of the scores of all the n components are maintained between the inference data f (x) and the alternative data r'. The order of the magnitudes of the scores of the inference data f (x) vector remains the same as the order of the magnitudes of the scores of the alternative data r' vector. That is, the order of the magnitude of components $f_1$ to $f_n$ contained in the inference data f(x) is the same as that of components $r_1'$ to $r_n'$ contained in the alternative data r'.

For example, when the component with the largest score among all components of the inference data f (x) is the 1-th component (1 is an arbitrary integer of 1 to n), the component with the largest score among all components of the alternative data r' is the 1-th component. Generally speaking, when the component having a p-th (p is an arbitrary integer of 1 to n) largest score among all the components of the inference data f (x) is the 1-th component, the component having the p-th largest score among all the components of the alternative data r' becomes the 1-th component.

When the input data x is the training data, the detector d outputs the alternative data r' as the output data s. Therefore, it is difficult for an attacker who performs an MI attack in the form of guessing the parameters of the target model f to extract significant information about the training data from arbitrary data. As a result, it is possible to make it difficult for an attacker to guess the parameters of the target model f. Therefore, the resistance against MI attacks can be improved.

Further, the inference apparatus 100 can perform inference with high accuracy. When the input data x is the non-member data, the inference apparatus 100 outputs the inference data f (x) as the output data s. When the input data x is the non-member data, the inference apparatus 100 outputs the alternative data r' as the output data s. The magnitude relationship of the scores is maintained between the inference data f (x) and the alternative data r'. Therefore, even if the input data x is the member data, distortion of the score and label loss can be prevented. Therefore, it is possible to prevent the decrease of the inference accuracy.

In the above description, the inference data f (x) and the alternative data r' maintain the magnitude relationship of all n components, but the present embodiment is not limited to this. For example, between the inference data f (x) and the alternative data r', the magnitude relationship of some of the n components may be maintained. For example, between the inference data f (x) and the alternative data r', it is sufficient if the order (dimension) of the components of the top score matches. In each of the inference data f (x) and the alternative data r', the component with the largest score may be the 1-th component.

In the alternative data r', an upper limit may be defined for the score. For example, when the component $r_{i1}'$ of the alternative data r' obtained by the random number is larger than the predetermined upper limit value, a different random number may be generated as the component of the alternative data r'.

The target model f and detector d are not used for adversarial regularization. Therefore, the parameters of the target model f and the detector d can be easily obtained by machine learning. Further, since the machine learning only needs to be performed at step 301 for obtaining the parameters of the target model f and at step 302 for obtaining the parameters of the detector d, the inference apparatus 100 can be easily generated. For example, it is not necessary to generate a defender by machine learning, which makes it impossible to distinguish between output data when non-member data is input and output data when member data is input. Therefore, the inference apparatus 100 can be easily generated by the method of the present embodiment.

In the above description, the detector d is a machine learning model, but the detector d is not limited to being a machine learning model. That is, although the machine learning model is used to determine whether the input data x is training data in the above embodiment, this determination procedure is not limited to the method using the machine learning model. For example, in the member data, since the top score of the inference data f (x) becomes very close to 1, the detector d can make a determination simply by comparing the top score with the threshold value. In this case, the target model f can be trained using all the training data. Thus, the inference accuracy of the target model f can be improved.

In the approach 1 described above, the alternative data r' is obtained by a random number, but it is also possible to obtain the alternative data r' by another approach. Hereinafter, another approach for obtaining the alternative data r' will be described.

(Approach 2)

The approach 2 uses an alternative data calculation model f' in which an adversarial regularization is performed on the target model f. Specifically, an alternative data calculation model f' is generated by regularizing the target model f by using an adversarial sample. The alternative data calculation model f' is a machine learning model generated by machine learning. The alternative data calculation model f' outputs the alternative data f' (x) when the input data is input to the alternative data calculation model f'. When x is member data, detector d will generate alternative data f' (x) as r'. The alternative data f' (x) corresponds to the above alternative data r'.

Adversarial regularization can prevent overtraining. Therefore, when the training data is input to the inference apparatus 100 during inference, the inference apparatus 100 outputs the alternative data f' (x) calculated by the alternative data calculation model f' as the output data s. As a result, it becomes difficult for an attacker who performs an MI attack in the form of guessing the parameters of the target model f to extract significant information about the training data from arbitrary data.

The alternative data calculation model f' may be trained using non-member data that is not used to train the target model f. The alternative data calculation model f' may be trained using the member data used to train the target model f. Further, the alternative data calculation model f' may be trained using both non-member data and member data. The alternative data calculation model f' may be stored in the output unit 103 of FIG. 1.

(Approach 3)

In approach 3, the method called MemGuard disclosed in Non-Patent literature 4 is used. MemGuard is implemented for the target model f. Specifically, noise is added to the inference data f (x) of the target model f. A noise vector is added to the score vector. The inference apparatus outputs the output data s in which the noise vector is added to the inference data f(x). Since the noise is described in detail in Non-Patent literature 4, the description thereof will be omitted.

(Approach 4)

Figure 4:
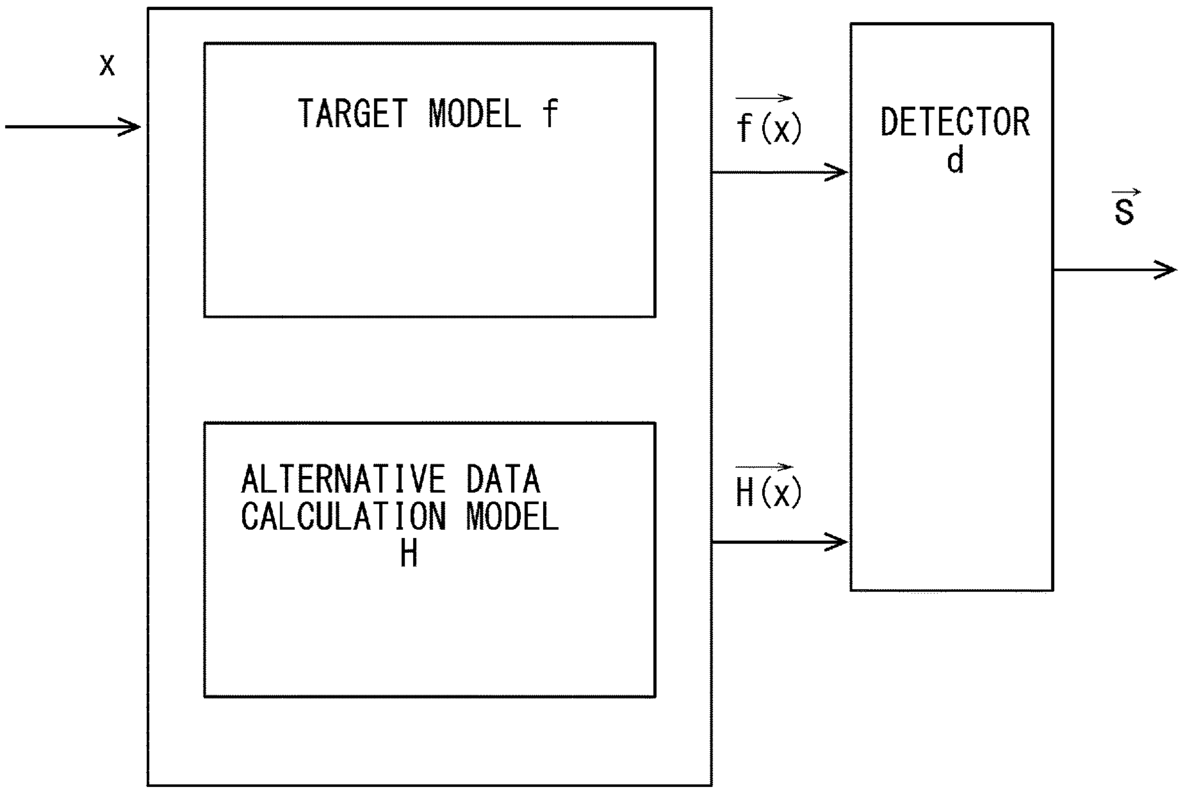
FIG. 4 is a diagram for explaining a process of the inference apparatus according to an approach 3.

In approach 4, the alternative data calculation model H generates the alternative data r'. As shown in FIG. 4, the inference apparatus 100 can access the target model f and the alternative data calculation model H. The target model f and the alternative data calculation model H each function as an inference unit, respectively. The alternative data calculation model H is a machine learning model different from the target model f. For example, parameters different from those of the target model f are set in the alternative data calculation model H.

The alternative data calculation model H is an inference algorithm for performing inference based on the input data x. When input data x are input to the alternative data calculation model H, the alternative data calculation model H outputs inference data H (x) indicating an inference result. The inference data H (x) corresponds to the above alternative data r'.

The alternative data calculation model H may be trained using non-member data not used for training the target model f. The alternative data calculation model H may be trained using the member data used to train the model f. Further, the alternative data calculation model H may be trained using both the non-member data and the member data.

The detector d detects whether the input data x is the member data or the non-member data from inference data f (x) of a target model f. When the input data x is the non-member data, the detector d outputs the inference data f (x) as the output data s. When the input data x is the member data, the detector d outputs inference data H (x) as the output data s. In this way, the inference apparatus can switch the inference units according to the detection result of the detector d. The alternative data calculation model H may be stored in the output unit 103 of FIG. 1.

Figure 5:
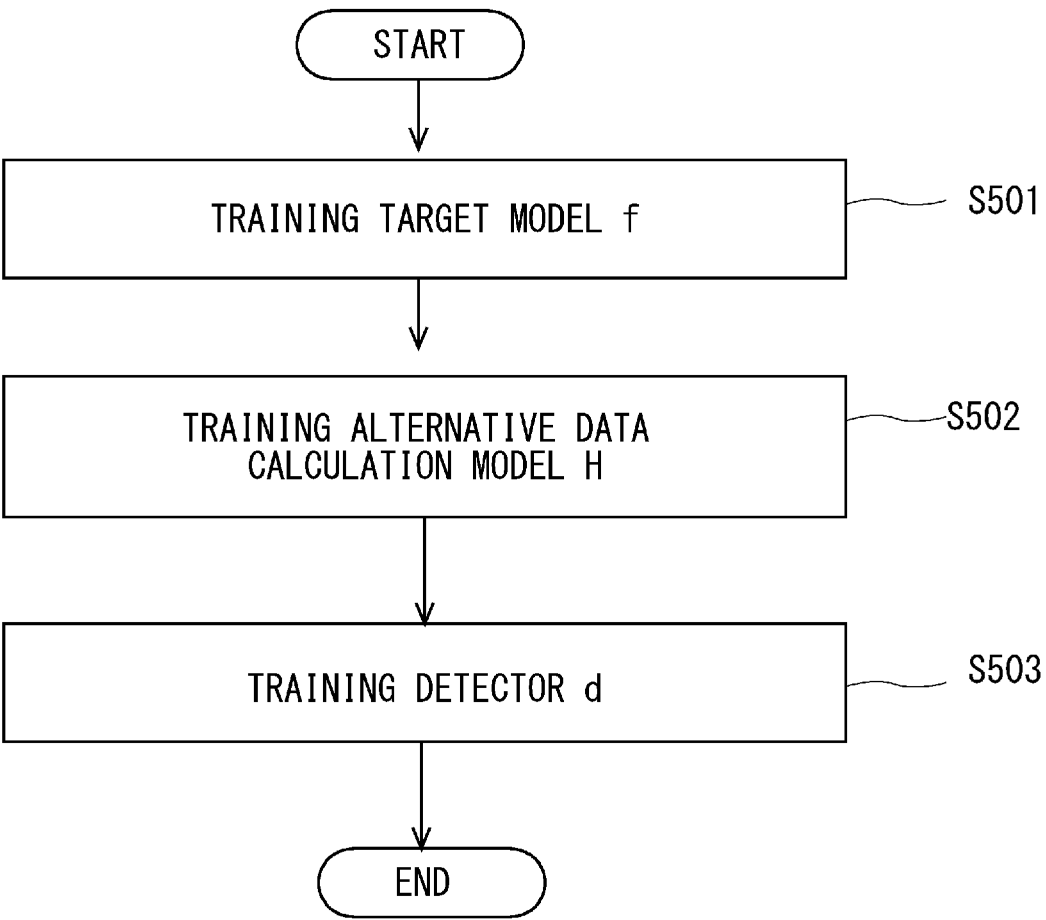
FIG. 5 is a flowchart of machine learning method according to the approach 3.

The machine learning method in the approach 4 will be described with reference to FIG. 5. FIG. 5 is a flowchart showing a machine learning method. First, the target model f is trained by machine learning (S501). Here, as in step 301, the supervised learning can be performed using the training data. Thus, the parameters of the target model f are optimized.

Next, the alternative data calculation model H is trained by machine learning (S502). Here, the parameters of the alternative data calculation model H are optimized using data different from the training data in step 501. That is, the alternative data calculation model H is trained using non-member data. Similar to step 501, an alternative data calculation model H is generated by supervised learning.

The detector d is trained by machine learning (S503). For example, machine learning of the detector d is performed using the target model f, member data, and non-member data. The detector d is stored in the determination unit 102 illustrated in FIG. 1. Since this step 503 is similar to the step 302, a description thereof is omitted. As a result of this machine learning, the inference apparatus 100 shown in FIG. 4 is generated.

(Approach 5)

In approach, an upper limit value is set to the component of f (x). For a component exceeding the upper limit value, the detector d corrects the value of the component. For example, the upper limit value may be 0.9. When the inference data f (x) includes a component $f_{i1}$ exceeding the upper limit value, the detector d corrects the component $f_{i1}$ to a value not exceeding the upper limit value. The approach 5 may be used in combination with the above method. For example, the detector d may determine the component $f_{i1}$ from a random number.

Further, the approach for obtaining the alternative data r' may be appropriately combined with the above-described approaches. The approach for obtaining the alternative data r' is not limited to the above-described approaches. It is possible to use a combination of an existing protection technique and the detector d.

In the above embodiments, the inference apparatus can be implemented by a computer program. That is, the inference apparatus, the determination unit, the output unit, the target model, the detector, and the like can be realized by a computer program. Further, the inference unit, the determination unit, and the output unit need not be physically a single device, and may be distributed to a plurality of computers.

Figure 6:
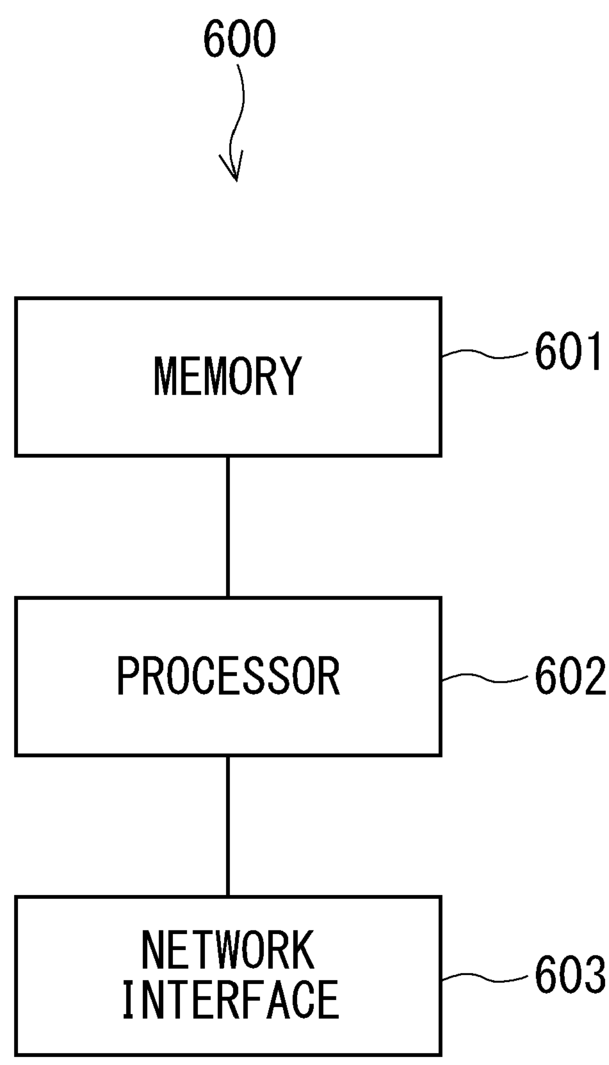
FIG. 6 is a block diagram showing a hardware structure of the machine learning apparatus.

Next, a hardware configuration of the inference unit or the machine learning apparatus will be described. FIG. 6 is a block diagram showing an example of a hardware configuration of the apparatus 600. As shown in FIG. 6, the apparatus 600 includes, for example, at least one memory 601, at least one processor 602, and a network interface 603.

The network interface 603 is used to communicate with other apparatuses through a wired or wireless network. The network interface 603 may include, for example, a network interface card (NIC). The apparatus 600 transmits and receives data through the network interface 603. For example, the apparatus 600 may acquire the input data x.

The memory 601 is formed by a combination of a volatile memory and a nonvolatile memory. The memory 601 may include a storage disposed remotely from the processor 602. In this case, the processor 602 may access the memory 601 through an input/output interface (not shown).

The memory 601 is used to store software (a computer program) including at least one instruction executed by the processor 602. The memory 601 may store the inference unit 101 or the target model f as the machine learning models. The memory 601 may store the determination unit 102, the output unit 103 or the detector d.

The apparatus 600 may also function as a machine learning apparatus for generating a machine learning model. In this case, the apparatus 600 stores the machine learning model before the training in the memory 601. The apparatus 600 updates the parameters of the machine learning model by inputting training data to the machine learning model and performing machine learning. The apparatus 600 stores parameters of a machine learning model and the like in the memory 601.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

REFERENCE SIGNS LIST

100 inference apparatus
101 inference unit
102 determination unit
103 output unit
600 apparatus
601 memory
602 processor
603 network interface
f target model
d detector

What is claimed is:

1. An inference apparatus comprising;

at least one memory storing instructions, and at least one processor configured to execute the instructions to;

perform inference based on input data using a first machine learning model trained using training data;

determine, using second machine learning model, whether input data is the training data or not based on inference data output from the first machine learning model indicating a result of inference when the input data is input to the first machine learning model; and output, by the second machine learning model, the inference data as output data based on the second machine learning model determining that the input data is not the training data, and output, by the second machine learning model, an alternative data different from the inference data as the output data based on the second machine learning model determining that the input data is the training data, wherein the inference data is an n-dimensional score vector including n scores, n being an integer greater than or equal to 2, the alternative data is an n-dimensional score vector having the same number of dimensions as that of the inference data, and an order of a component of a top score of the inference data is matched with that of the alternative data; and wherein components of the alternative data are n random numbers, and the n random numbers are rearranged in accordance with a relationship between a magnitude of the n scores of the inference data such that the order of the magnitudes of the n scores of the inference data is the same as that of the alternative data.

2. The inference apparatus according to claim 1, wherein an upper limit is set for the top score in the alternative data.

3. The inference apparatus according to claim 1, further comprising; a third machine learning model trained using non-member data different from the training data.

4. The inference apparatus according to claim 1, further comprising; a third machine learning model trained using the training data and non-member data different from the training data.

5. An inference method comprising;

inputting input data to a first machine learning model trained using training data;

performing inference by the first machine learning model to output inference data indicating a result of the inference;

determining, using a second machine learning model, whether the input data is the training data or not based on the inference data; and outputting, by the second machine learning model, the inference data as output data based on determining that the input data is not the training data, and outputting an alternative data different from the inference data as the output data based on determining that the input data is the training data wherein the inference data is an n-dimensional score vector including n scores, n being an integer greater than or equal to 2, the alternative data is an n-dimensional score vector having the same number of dimensions as that of the inference data, and an order of a component of a top score of the inference data is matched with that of the alternative data; and wherein components of the alternative data are n random numbers, and the n random numbers are rearranged in accordance with a relationship between a magnitude of the n scores of the inference data such that the order of the magnitudes of the n scores of the inference data is the same as that of the alternative data.

6. A non-transitory computer-readable storage medium storing a program that causes a computer to execute an inference method:

the method comprising;

inputting input data to a first machine learning model trained using training data;

performing inference by the first machine learning model to output inference data indicating a result of the inference;

determining, using a second machine learning model, whether the input data is the training data or not based on the inference data; and outputting, by the second machine learning model, the inference data as output data based on determining that the input data is not the training data, and an alternative data different from the inference data as the output data based on determining that the input data is the training data wherein the inference data is an n-dimensional score vector including n scores, n being an integer greater than or equal to 2, the alternative data is an n-dimensional score vector having the same number of dimensions as that of the inference data, and an order of a component of a top score of the inference data is matched with that of the alternative data; and wherein components of the alternative data are n random numbers, and the n random numbers are rearranged in accordance with a relationship between a magnitude of the n scores of the inference data such that the order of the magnitudes of the n scores of the inference data is the same as that of the alternative data.

* * * * *